May 22, 1962 P. DEFONTENAY 3,035,784
SPEED REGULATING SYSTEM
Filed Nov. 5, 1958 3 Sheets-Sheet 1

May 22, 1962 P. DEFONTENAY 3,035,784
SPEED REGULATING SYSTEM
Filed Nov. 5, 1958 3 Sheets-Sheet 2
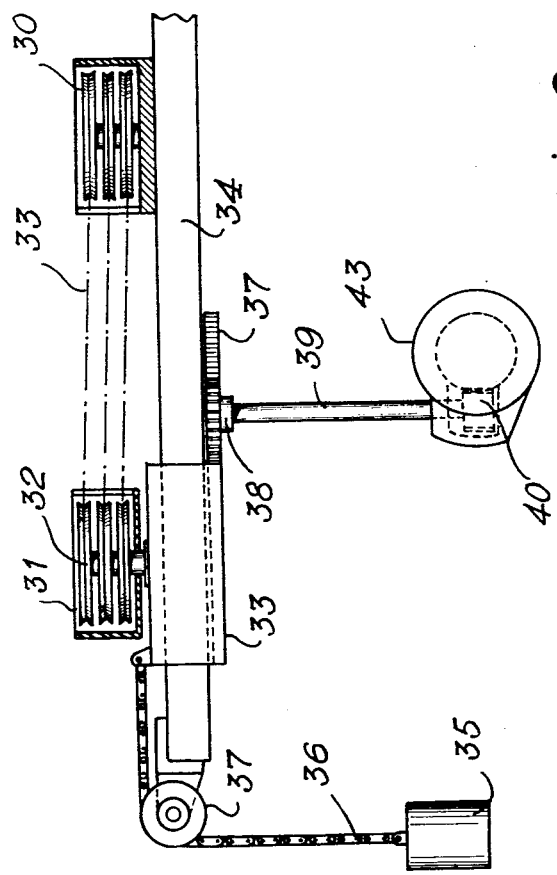
PAUL DEFONTENAY
INVENTOR
By Fritz D. Hochwald
AGENT May 22, 1962
P. DEFONTENAY
3,035,784
SPEED REGULATING SYSTEM
Filed Nov. 5, 1958
3 Sheets-Sheet 3
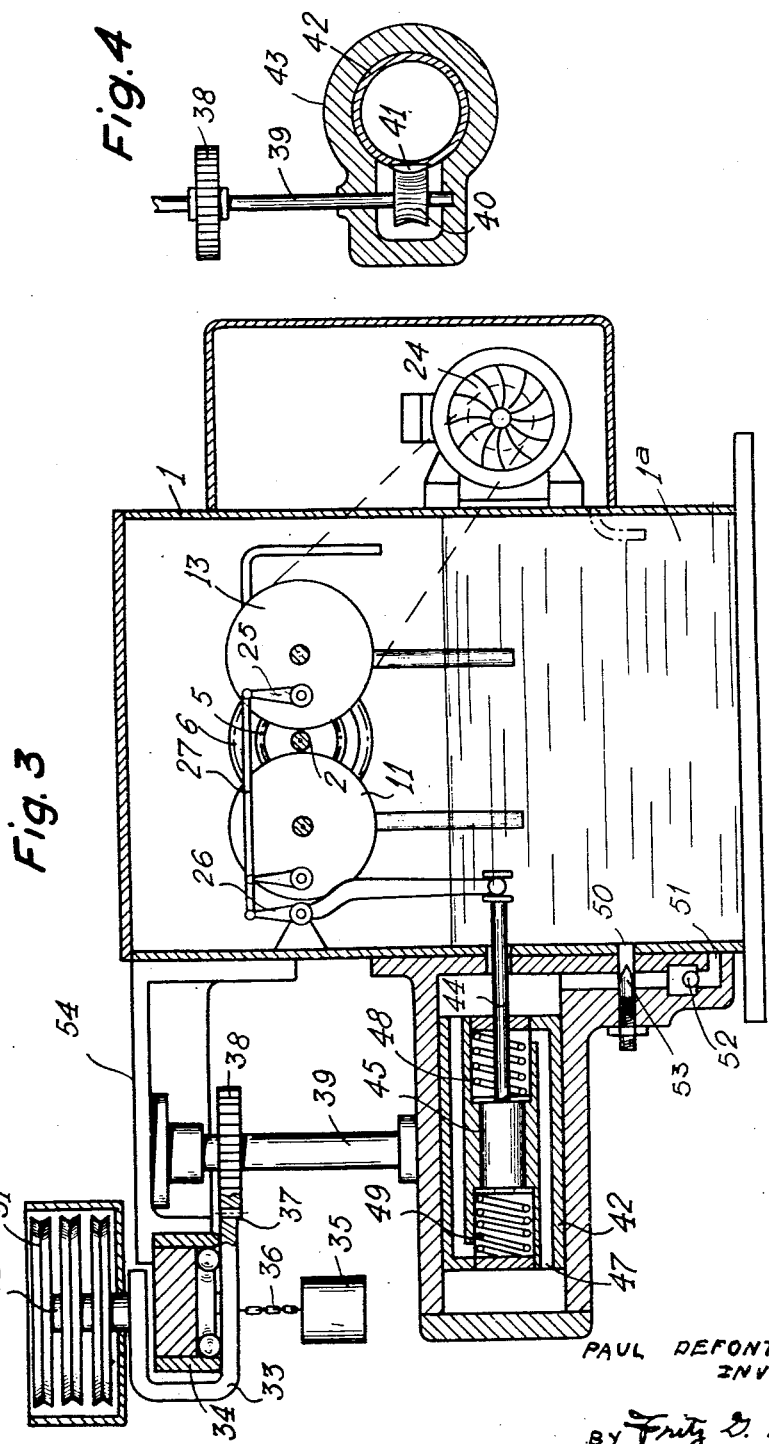
PAUL DEFONTENAY
INVENTOR
BY Fritz G. Hochwald
AGENT United States Patent Office 3,035,784
Patented May 22, 1962

3,035,784
SPEED REGULATING SYSTEM
Paul Defontenay, 19 Rue Yvonne,
Bourg-la-Reine, France
Filed Nov. 5, 1958, Ser. No. 772,039
Claims priority, application France Nov. 18, 1957
1 Claim. (Cl. 242—45)

This invention relates to systems for regulating the speed of rotation of a shaft in response to a variable factor or condition, and has especial though not exclusive application in connection with the regulation of the speed of rotation of a reel in response to a selected condition of the material being reeled or unreeled, such in particular as the tension of said material.

In accordance with the invention, a system for controlling the speed of rotation of a shaft in response to a variable factor comprises two hydraulic coupler units each comprising a fixed sealed casing, a rotatable coupler shaft projecting from the casing, a gear pump in the casing having a gear secured on the coupler shaft, pump inlet and outlet conduit means connecting the casing with a source of liquid and a valve in said conduit means for adjustably restricting the flow therethrough to vary the brake force applied to the associated coupler shaft, the coupler shaft of one of said units being connected, e.g. by gearing, with said controlled shaft, a differential unit comprising three differentially-related elements, e.g. a planetary-carrier and two sun-gears, one of said elements being power-driven from motor means, the other two elements being respectively connected, e.g. by gearing, with the coupler shaft of the other coupler unit and with the controlled shaft, and means responsive to said factor and connected with both coupler valves for simultaneously and reversely adjusting these valves on variation in said factor, whereby reversely to alter the brake force applied to the respective coupler shafts and correspondingly differentially to vary the speed of rotation of the controlled shaft in response to the variation in said factor.

Each hydraulic coupler unit may desirably assume the form disclosed in U.S. Patent No. 2,813,601 assigned to me. Similarly, the differential unit may desirably assume the form disclosed in French Patent No. 930,544, wherein the unit is constructed in the form of a hollow pulley or the like adapted to be peripherally driven by way of a belt drive, said hollow pulley constituting a planetary carrier for a planetary-type epicyclic differential gearing, which gearing includes two coaxially rotatable sungears respectively meshing with planet gears journalled in the carrier, and the shafts of said sungears projecting in coaxial relation out of said pulley. It will be understood however that various other and conventional differential mechanisms would be equally suitable.

An exemplary embodiment of the invention, as applied to the control of a reel in accordance with the tension of the reeled material, will now be described for purposes of illustration, but not of limitation with reference to the accompanying drawings, wherein:

FIG. 2 is a diagram illustrating the operation of a compensator device;

FIG. 3 is a side section on line III—III of FIG. 1;

FIG. 4 is a detail view of the means operating the rate device.

Figure 1:
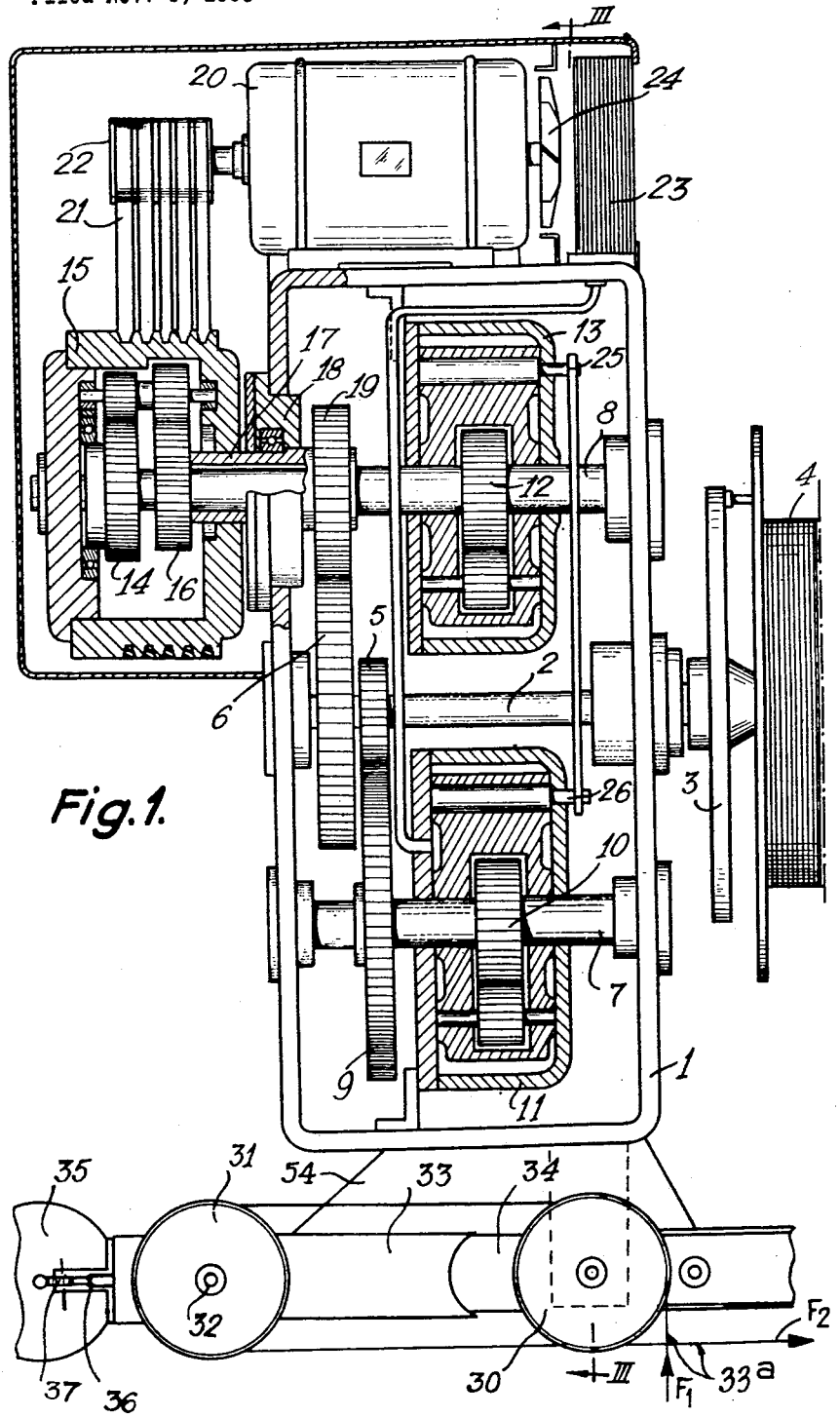
FIG. 1 is a horizontal section of a machine constructed in accordance with the invention.

As shown in the drawings, the reel system comprises a frame 1, the lower section 1a of which serves as a reservoir or sump for hydraulic fluid.

A main shaft 2 is journalled in bearings carried by two opposite side walls of said frame. Keyed on the shaft externally of the frame 1 is a driver disc 3 for driving the reel 4, and keyed on the shaft within the frame are a pair of closely spaced gears 5 and 6.

Journalled parallel to the main shaft 2 are two further shafts 7 and 8. The shaft 8 extends through the wall of frame 1 as will be later described. Secured on shaft 7 are a gear 9 which meshes with the gear 5 and a gear 10 forming part of the gear pump of a first hydraulic coupler 11, the casing of which coupler is fixedly secured to the frame 1. The coupler is generally similar to that described in U.S. Patent No. 2,813,601 except that its casing is secured to the frame 1 as just stated.

Secured on the shaft 8 within the casing is a gear 12 forming part of the gear pump of a second hydraulic coupler 13 having its casing secured to the frame. The coupler 13 is similar to the coupler 11. Both couplers cooperate in providing a negative action hydraulic speed-variator as will later appear.

Keyed on shaft 8 outside the frame 1 is the input sungear 14 of an epicyclic reducer pulley 15 of the type disclosed in French Patent No. 930,544, while the output sungear 16 of this reducer pulley has coaxially secured to it a sleeve 17 which extends through the journal bearing 18 and has keyed to it a gear 19 meshing with the afore-mentioned gear 6. The epicyclic reducer pulley 15 is driven from a motor 20 by way of drive belt 21 and belt pulley 22.

The couplers 11 and 13 communicate with the hydraulic fluid reservoir or sump 1a. A radiator 23 and fan 24 driven by motor 20 serve to cool the fluid. The valve adjusting elements 25 and 26 of the couplers 11 and 13 are mechanically coupled by actuating linkage 27, operation of which will be later described.

A compensating unit is provided, the precise nature of which will depend on the nature of the material being reeled. The function of the compensator is to sense the tension in the material, and it is interposed between the reel 4 and the output or input unit, not shown.

The compensator may, by way of example, assume the form shown in FIG. 2. A lever 28 pivoted at one end 28a to a fixed fulcrum 54, e.g. on the frame 1, carries a weight 29 suitably positioned and dimensioned thereon, and the free end of the lever carries a roller 30 engaging the reeled material. It will be noted that the compensator 28, the weight 29 of which determines the tension of this material, converts any difference in velocity between the reel and the material output or input member, into an angular displacement which is used to cause corresponding variations in the speed of rotation of the reel. A compensator of the type shown in FIG. 2 is especially applicable in the case of large cables or sheets reeled at relatively low velocities.

In the case of fine wire reeled at high velocities a pulley-block type of compensator of the kind shown in FIGS. 1 and 3 is preferably used. This device includes a multi-groove lay pulley 30 having a fixedly positioned axis of rotation and another multi-groove pulley 31, the pivot 32 of which is carried on a carriage 33 sliding on a rail 34 fixed on the fulcrum 54, said carriage being movable so as to be movable towards and away from pulley 30. A weight 35 is attached to the end of a sprocket chain 36 trained over a suitable sprocket gear 37 serving to deflect the chain angle and having its other end attached to an end of the carriage 33, so as to urge the carriage to a position remote from the pulley 30. Somewhat in the manner of a pulley-block, the material 33a is fed in at F1 tangentially to the pulley 30, goes around the pulley 31 and then round pulley 30 and back again around pulley 31, emerging from the pulley-block assembly at F2, whence it is led to a conventional reciprocatory feeder device (serving to produce a smooth juxtaposal of the successive turns in layers coiled around the reel 4). It will readily be understood that due to the action of weight 35, any variations in the tension of the reeled material are converted into linear displacements of the carriage 33.

Such linear displacements, in the construction of FIGS. 1 and 3, or angular displacements of lever 28 in the case of FIG. 2, are used to actuate, directly or indirectly, the leverage 27 operating the valve adjusting elements of the couplers 11 and 13.

In order to produce a well-formed coil and avoid the possibility of breakage or/and "creep" of the reeled material, it is desirable that the compensator should act to modify the velocity of the reel as quickly as possible. It is desirable therefore to provide quick-acting means in the linkage from the compensator to the reel.

For this purpose, the carriage 33 is formed with a rack 37 on one of its sides meshing with a gear 38 keyed on a shaft 39, which also carries a gear 40 meshing with a rack 41 formed on a side of a piston 42 slidable in a cylinder 43 secured to the frame 1. This cylinder communicates at one end with the hydraulic fluid reservoir 1a. If the piston rod 44 is made to act on the linkage 27, the piston displacements will result in a positional adjustment of the adjusting levers 25 and 26 of couplers 11 and 13. If the initial arrangement and lever setting are such that when angularly displaced in a common direction one lever acts to close the associated hydraulic circuit, while the other acts to open its circuit, then displacement of the carriage 33 in response to variation in material tension, will cause, through rotation of gears 38 and 40, displacement of rack 41 and, hence, piston 42 and linkage 27, to open one of the adjusting levers and close the other, thereby modifying the speed of reel rotation. The speed will be increased (the valve of coupler 13 being closed down and that of coupler 11 opened wide) or decreased (the valve movements being reversed) according as the compensator carriage 32 is moving away from or towards the pulley 30.

Just as any hydraulic system, the system described above possesses some inertia and tends to cause braking whenever the piston suddenly reverse its direction of displacement. To overcome this difficulty, the rod 44 rather than being connected directly to the piston 42 is connected to piston 45 slidable in the piston 42; the piston 45, the opposite sides of which are cross-connected with the respectively opposed sides of piston 42 by way of the cross-connecting ducts 46 and 47, is held in a position of balance within the piston 42 by the pair of prestressed springs 48 and 49.

The piston 42 in response to a sudden impulse is unable to respond immediately, so that the pressure quickly rises in one or the other chamber of cylinder 43, destroying the balance of pressure reactions against the springs 47 and 48 and thereby causing an amplified displacement of the piston 45; this in turn displaces the linkage 27 and adjusting levers 25 and 26, producing an immediate action on the couplers 11 and 13.

Desirably, the cylinder 43 communicates with the sump 1a by way of two conduits 50 and 51, the one controlled by a valve 52 and the other by an adjustable needle valve 53 serving to provide a controlled leakage therethrough.

The accelerator device described makes it possible to apply to an input or an output reel a motor or load torque, which is proportional to the rate of displacement of the compensator used rather than being proportional to the amount of said displacement. It therefore ensures synchronism between the velocities of both elements and imparts stability to the velocity, i.e. eliminates any tendency to hunt in the well-known matter of rate devices, and makes it possible to minimize the necessary drive power through an appropriate setting imparted, after suitable testing, to the positions of the valve levers.

A reeling machine, e.g. for the high-speed reeling of fine thread, constructed as thus described, operates in the following manner:

With the thread tension being adjusted to the optimum value for smooth reeling, the tension is balanced by the weight 35, so that the compensator carriage 33 is stationary and, hence, in effect inoperant. Should the tension suddenly increase, the carriage 33 is moved towards pulley 30 as explained above, and the rate-responsive device as a result of this displacement immediately adjusts the valve levers of couplers 11 and 13. The valve lever of coupler 11 is moved towards closure, and the resulting reduction in the flow rate of the fluid results in retarding the associated pump on the shaft 7 of which is keyed the gear 9 directly meshing with the gear 5 of the main shaft 2 carrying the reel driver disc. The rotational speed of the reel is thus immediately reduced.

On the other hand, the rate-responsive device acting by way of linkage 27 has adjusted valve lever 27 towards opening position, increasing the rate of fluid discharge in coupler 13 and thus releasing the shaft 8 having the input sungear 14 of the reducer pulley keyed on it. Since the output sungear 16 of said pulley is secured to bushing 17 rigid with the gear 19 meshing with gear 6 on the main shaft 2, the slowing down of this shaft results in slowing down the sungear, allowing said pulley to act as a differential, since it has its periphery rotated at constant speed from the motor.

A reduction in thread tension would obviously result in reverse effects.

What I claim is:

In a system for controlling the rotation of a reel in response to a condition of the material being reeled, a reel drive shaft, two hydraulic coupler units each comprising a fixed seal casing, a rotatable coupler shaft projecting from the casing, a gear pump in the casing having a gear driven by said coupler shaft, pump conduit means connecting the casing with a source of liquid and a valve in said conduit means for adjustably restricting the flow therethrough to vary the degree of braking applied to said coupler shaft, means drivingly connecting said reel shaft with one coupler shaft, a differential unit comprising three differentially related elements, motor means connected for driving one of said elements, means drivingly connecting another of said elements with said other coupler shaft, and means drivingly connecting the third element with said reel drive shaft, means sensing said conditions of the reeled material and connected with both valves to simultaneously and reversely adjust said valve in response to any variation in said condition whereby to reversely alter the brake forces applied to both coupler shafts and correspondingly differentially to vary the feed of said reel drive shaft, and movable linkage interconnecting said valves in ganged relationship such that movement of the linkage causes reverse adjustments of the respective valves, and means including pressure-fluid means connecting said linkage with said condition-sensing device, said pressure-fluid means comprising an outer fluid cylinder connected with a source of pressure fluid, an outer piston slidable in said outer cylinder and connected for displacement by said condition-sensing means, recessed means in said outer piston defining an inner cylinder therein, an inner piston slidable in said inner cylinder and connected to operate said linkage, spring means normally retaining said inner piston in a centered position within said inner cylinder, and cross-connecting duct means in said outer piston connecting each end of said outer cylinder with the respectively opposite end of said inner cylinder.

References Cited in the file of this patent

UNITED STATES PATENTS

| 1,786,917 | Oehmichen | Dec. 30, 1930 |
| 2,012,208 | Wildy | Aug. 20, 1935 |
| 2,064,295 | Crane | Dec. 15, 1936 |
| 2,825,512 | Andrew | Mar. 4, 1958 |

FOREIGN PATENTS

| 961,176 | France | Nov. 14, 1949 |